United States Patent
Valente

(10) Patent No.: US 10,625,372 B2
(45) Date of Patent: Apr. 21, 2020

(54) DEVICE FOR CHECKING A WELD BEAD

(71) Applicant: European Welding Group sprl, Charleroi (BE)

(72) Inventor: Raffaele Valente, Charleroi (BE)

(73) Assignee: EUROPEAN WELDING GROUP SPRL, Charleroi (BE)

(*) Notice: Subject to any disclaimer, the term of this patent is extended or adjusted under 35 U.S.C. 154(b) by 336 days.

(21) Appl. No.: 15/639,147

(22) Filed: Jun. 30, 2017

(65) Prior Publication Data

US 2018/0001419 A1    Jan. 4, 2018

(30) Foreign Application Priority Data

Jul. 1, 2016  (EP) .................................... 16177432

(51) Int. Cl.
| | | |
|---|---|---|
| B23K 26/03 | (2006.01) | |
| G01B 3/14 | (2006.01) | |
| G01B 5/00 | (2006.01) | |
| G01J 5/00 | (2006.01) | |

(52) U.S. Cl.
CPC .............. *B23K 26/032* (2013.01); *G01B 3/14* (2013.01); *G01B 5/0037* (2013.01); *G01J 5/0018* (2013.01); *G01J 2005/0077* (2013.01)

(58) Field of Classification Search
CPC ...... B23K 26/032; G01B 3/14; G01B 5/0037; G01B 3/00; G01B 3/26; G01B 3/44; G01J 5/0018; G01J 2005/0077

See application file for complete search history.

(56) References Cited

U.S. PATENT DOCUMENTS

| | | | | |
|---|---|---|---|---|
| 2,389,842 A * | 11/1945 | Cummins | ................ | G01B 3/00 33/833 |
| 2,409,019 A | 10/1946 | Cree | | |
| 4,637,142 A * | 1/1987 | Baker | ...................... | G01B 5/02 33/473 |
| 5,611,149 A * | 3/1997 | Fujiwara | .............. | G01B 5/0037 33/534 |
| 6,505,410 B1 * | 1/2003 | Lycan | .................. | G01B 5/0037 33/1 N |
| 6,594,914 B1 * | 7/2003 | Babcock | .................. | A63C 3/10 33/535 |
| 2014/0230263 A1 * | 8/2014 | Livitski | ................ | G01B 5/0037 33/701 |
| 2015/0052646 P1 * | 2/2015 | Nir | .......................... | A01H 5/02 Plt./229 |

FOREIGN PATENT DOCUMENTS

| | | |
|---|---|---|
| CA | 1240500 A | 8/1988 |
| CN | 202869418 U | 4/2013 |
| DE | 1156241 B | 10/1963 |
| GB | 439319 | 12/1935 |

* cited by examiner

*Primary Examiner* — Brian W Jennison
(74) *Attorney, Agent, or Firm* — Norris McLaughlin, P.A.

(57) ABSTRACT

Devices and methods comprise at least one gauge for inspecting weld seams comprising a plurality of cutouts: a square cutout, a rectangular cutout, a concave cutout with a protuberance; and a straight edge ending with a protruding part. The devices and methods make it possible to inspect the compliance of a weld bead with various quality standards, without taking measurements, or referring to said standards.

12 Claims, 5 Drawing Sheets

DEVICE FOR CHECKING A WELD BEAD

This application claims foreign priority benefit under 35 U.S.C. 119 of European Application No. EP 16177432.8 filed Jul. 1, 2016.

FIELD OF THE DISCLOSURE

The present devices and methods relate to the field of welding, and more particularly the present devices and methods relate to a device comprising a plurality of gauges for inspecting the quality of a weld bead, in particular relative to the regulations in force in the aforementioned field.

BACKGROUND OF THE DISCLOSURE

The present devices and methods relate to an inspection device, and more particularly a device comprising inspection gauges for welds. Such gauges are used for the visual inspection of weld beads in welded assemblies. Said welded assemblies are subject to regulations in order to ensure the solidity and quality of the welding work. For example, standard EN 1090-2 requires a visual inspection that consists first of verifying whether the inspected weld has surface flaws at the weld bead. This first inspection must be done according to the instructions of standard EN ISO 17637. Secondly, said visual inspection consists of verifying whether the observed flaws are acceptable under the acceptance criteria. Said acceptance criteria are given by various quality standards, based on the type of weld, the subsequent use of the welded elements, the required quality level, etc. As an example, standards EN ISO 5817, EN 1090, EN 15085, or even "client" standards must be consulted during this second step.

The regulations in force require the visual inspection of all of the weld seams present in any welded construction. In practice, the visual inspection is done by the welder directly after producing the weld bead. Said visual inspection is therefore done in the production workshop, where the environmental conditions are not optimal for taking measurements sometimes requiring a precision of around one hundredth of a millimeter.

In the current state of the art, in order to determine, identify and/or sense whether a surface flaw on a weld bead is acceptable according to any given standard, a visual inspection is done. First, the welder must select a mechanical dimensional measuring tool to make it possible to take measurements at the weld bead in order to verify the size of the flaw. Secondly, the welder must measure the flaw. Third, the welder must calculate the allowances according to the acceptance criteria set out in a given quality standard to be applied. Lastly, and fourth, the welder must inspect whether the results of the measurements are within the calculated allowances.

Many mechanical dimensional measuring devices making it possible to take measurements at the weld bead exist. As an example, document CA1240500 describes such an apparatus making it possible to perform the second step of the inspection of a flaw in a weld bead, as described above. Other devices making it possible to take these measurements are vernier devices of the sliding type, or even comparative stationary devices of the gauge type.

Yet the environmental conditions of the production workshop as well as the knowledge level of the welder make these dimensional measuring devices very difficult and very uncomfortable to use, which creates low repeatability and precision of the measuring results. Furthermore, the use of these devices does not make it possible to eliminate the analysis and comparison steps after taking the measurement. The mechanical dimensional measuring devices of the gauge type consisting of taking a measurement by comparison with predefined dimensions, the obtained measuring results are not precise enough. The result of the inspection may thus be unreliable.

BRIEF DESCRIPTION OF THE DISCLOSURE

The present devices and methods aim to offset these above-mentioned drawbacks, to at least partially resolve the problems of the state of the art. One aim of the present devices and methods is to make the inspection of weld beads by visual inspection simpler, more precise and more ergonomic. Another aim of the present devices and methods is to make welders' work easier during steps for inspecting flaws of a weld bead by providing a simple tool making it possible to eliminate complicated or time-consuming steps of the flaw inspection process.

According to the present disclosure, devices and/or methods provide for inspecting at least one flaw of a weld bead relative to a welding quality standard, said device being characterized in that it comprises a plurality of gauges positioned on one or several elements comprised in the device, the plurality of gauges comprising:
a) At least one first gauge made up of a square cutout,
b) At least one second gauge made up of a first concave cutout comprising a pilot point extending toward the outside of said first concave cutout,
c) At least one third gauge made up of a rectangular cutout,
d) At least one fourth gauge made up of a straight edge and a protruding part positioned at one end of the edge.

Indeed, owing to such devices and methods, the gauges make it possible to inspect a plurality of geometric properties during the visual inspection. The present devices and methods thus reduce the visual inspection procedure to simply applying at least one of the three gauges on the weld bead and at the observed flaw, and observing whether said observed flaw on the weld bead complies with the requirements of the regulations in force for the weld bead.

According to one preferred embodiment of the disclosure, the devices and/or methods comprise a plurality of first gauges, and/or a plurality of second gauges, and/or a plurality of third gauges, and/or a plurality of fourth gauges. Still more preferably, the gauges of the same shape have at least one different property, for example a width, length, etc.

Owing to this preferred embodiment, a same flaw can be inspected relative to a plurality of standards by using the plurality of gauges with an identical shape.

BRIEF DESCRIPTION OF THE DRAWINGS

These aspects, as well as other aspects of the present devices and methods, will be clarified in the detailed description of specific embodiments of the disclosure, reference being made to the drawings of the figures, in which.

The drawings of the figures are not to scale, or proportionate. Generally, similar or identical elements are denoted by identical references in the figures.

DETAILED DESCRIPTION OF THE DISCLOSURE

The disclosure is directed to at least one device (1) for inspecting at least one dimension of a flaw at a weld bead relative to a welding quality standard. A dimension for example refers to a thickness, a height, or a groove depth, for example. A welding quality standard may correspond to the standards present in documents EN 1090, ISO EN 3834, EN 15085, ISO 9001.

A flaw refers to any flaw read in standard EN ISO 6520-1. As an example, a flaw may be a cavity, an irregular shape, an unsuitable dimension, a weld bead with a deposit, or a fault in a welding groove. Still as an example, a flaw may be an excessive deposition of material in a welding groove.

The device (1) may comprise a plurality of gauges (10, 20, 30, 40) with different shapes. The device (1), owing to the plurality of gauges (10, 20, 30, 40), makes it possible to determine the compliance of the weld bead with at least one criterion present in a welding standard, and not take a measurement on a weld bead in order to determine a dimensional value thereof.

Figure 1:
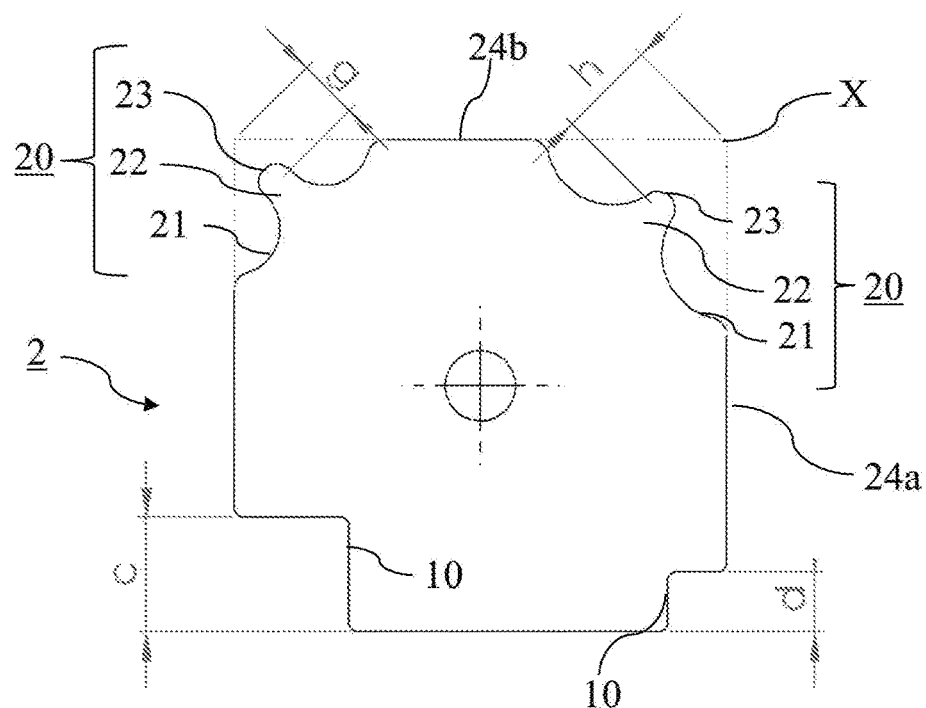
FIG. 1 is a front view of a plurality of first gauges and second gauges positioned on an element of a device according to an embodiment.
Figure 3:
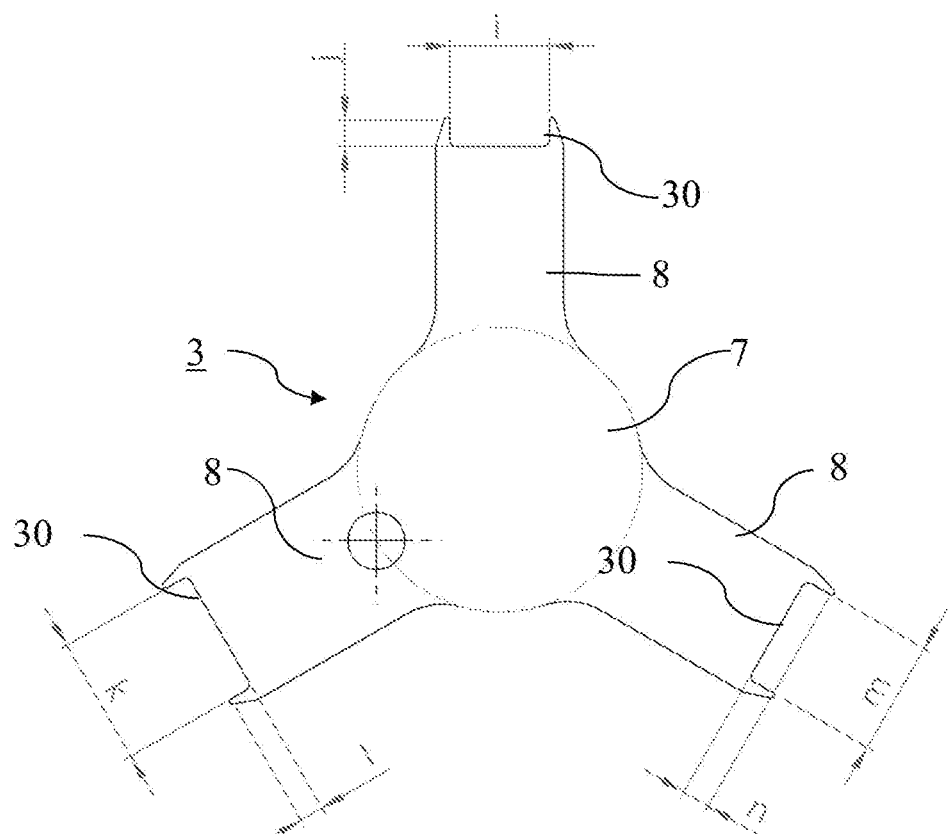
FIG. 3 is a front view of a plurality of third gauges positioned on an element of a device according to an embodiment.
Figure 5:
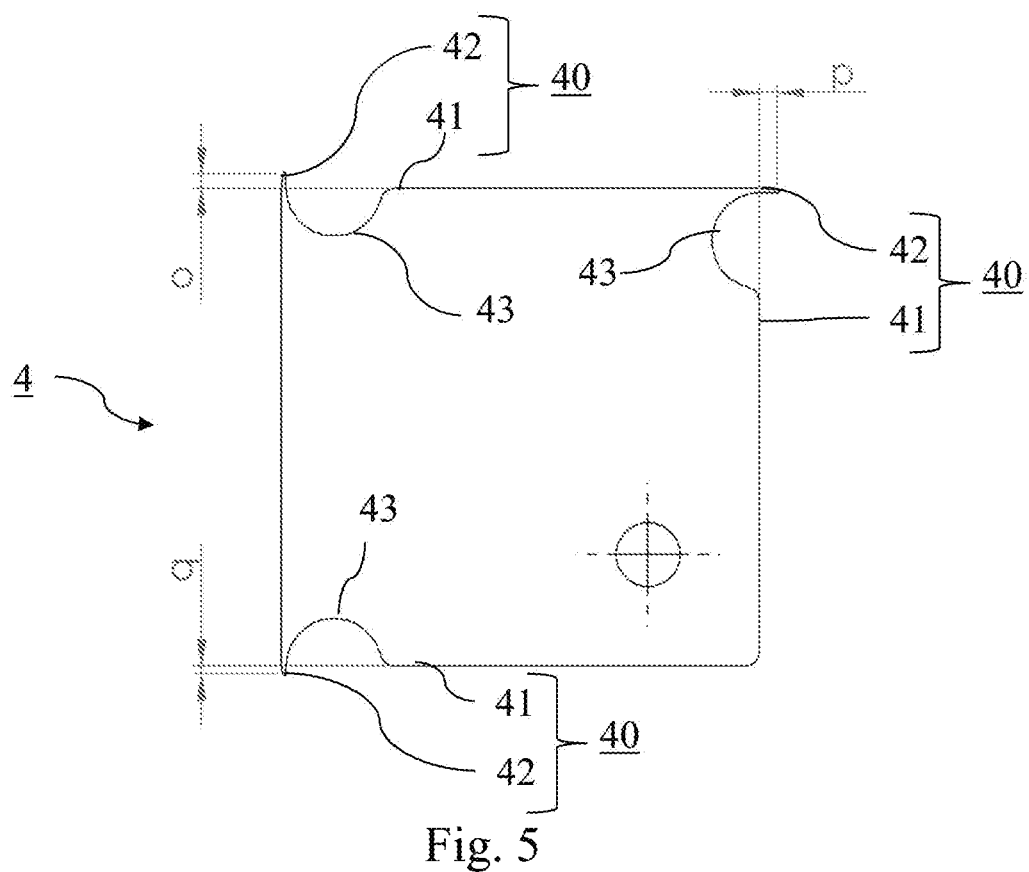
FIG. 5 is a front view of a plurality of fourth gauges positioned on an element of a device according to an embodiment.
Figure 10:
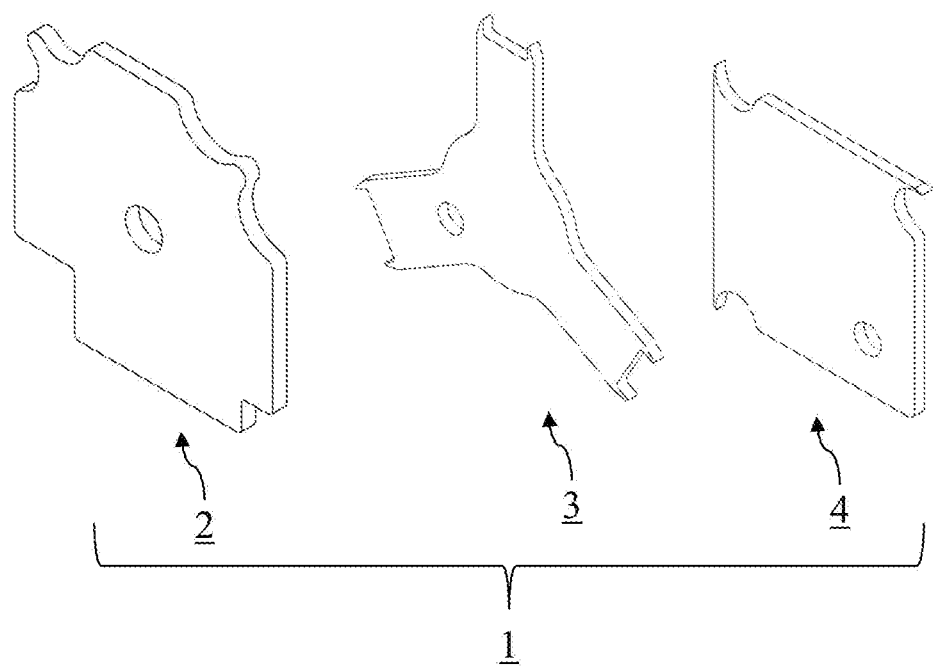
FIG. 10 is an illustration of the device according to an embodiment, with the various gauges being positioned on a plurality of separate elements.

The device may comprise the various gauges (10, 20, 30, 40) on a plurality of separate elements (2, 3 and 4), as shown in FIGS. 1, 3 and 5, and this plurality of separate elements then forms the device (1) as shown in FIG. 10. Alternatively, the different gauges (10, 20, 30, 40) can be positioned on a single element, not shown in the figures.

The device may be made from any rigid and non-ductile material. As an example, the device may be made from steel or stainless steel.

Figure 2:
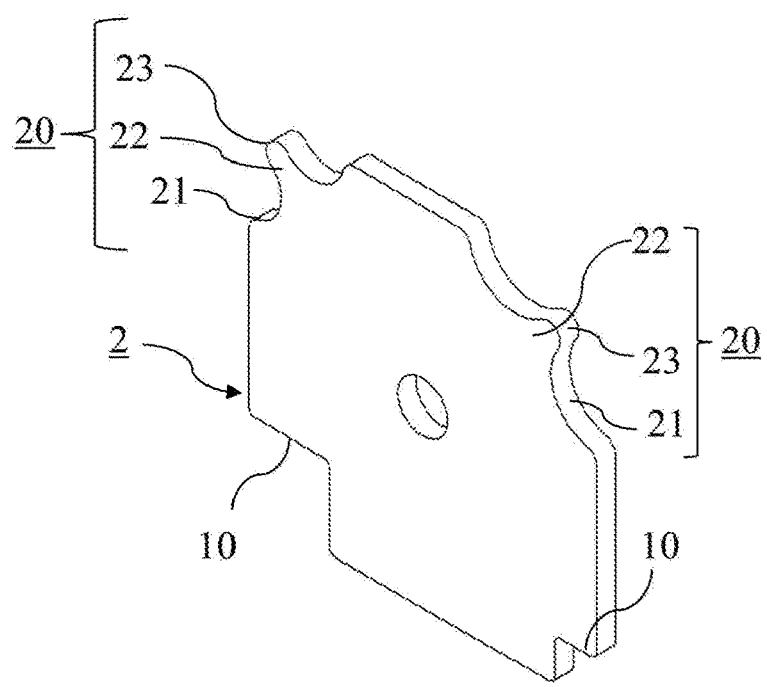
FIG. 2 is a perspective view of the element of the device illustrated in FIG. 1.
Figure 4:
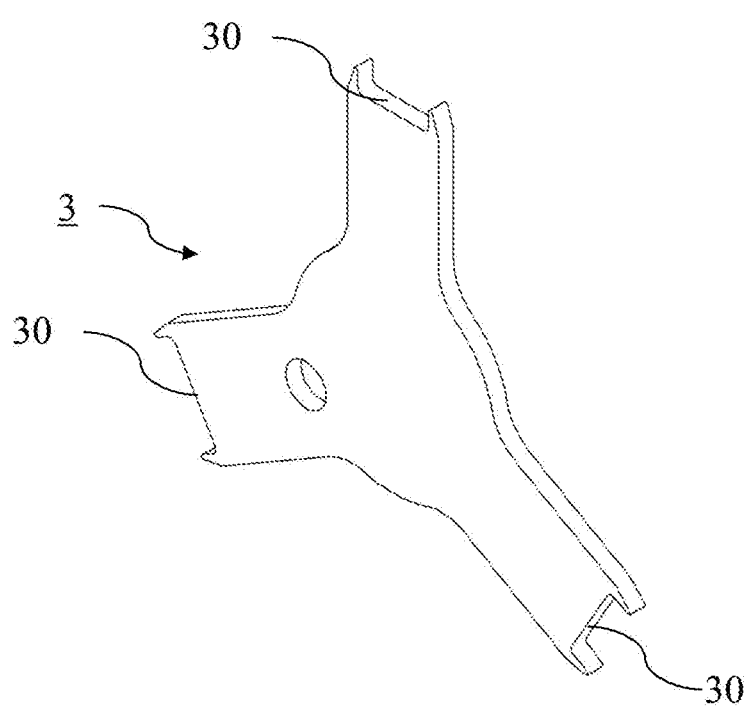
FIG. 4 is a perspective view of the element of the device illustrated in FIG. 3.
Figure 6:
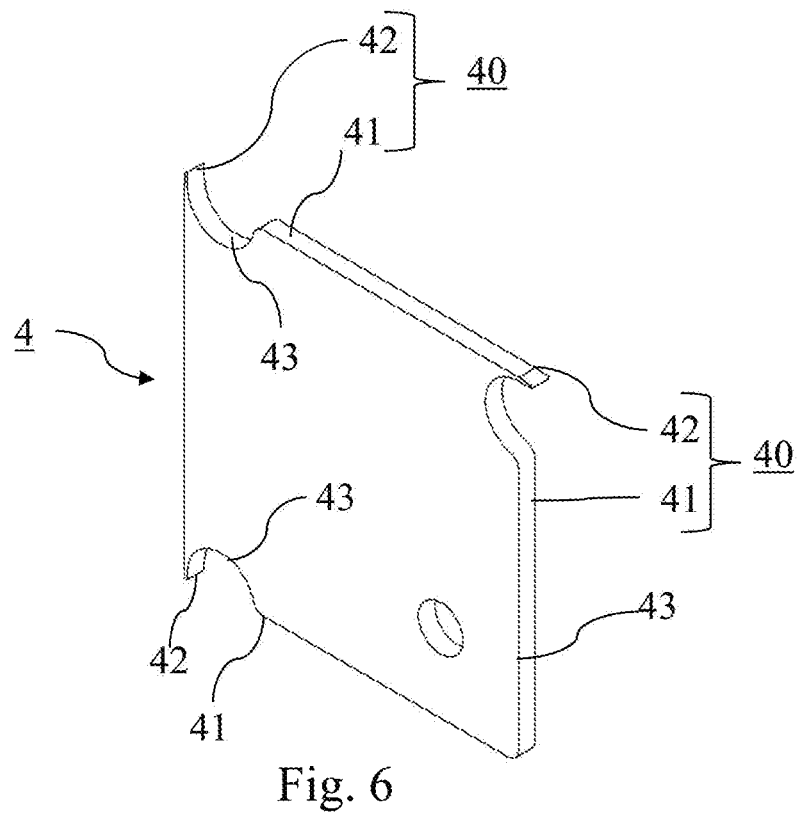
FIG. 6 is a perspective view of the element of the device illustrated in FIG. 5.

The device therefore comprises several gauges:
- At least one first square gauge (10), shown in FIG. 1 and FIG. 2;
- At least one second gauge (20) made up of a concave cutout (21) comprising a pilot point (22) extending toward the outside of the concave cutout, illustrated in FIG. 1 and FIG. 2;
- At least one third rectangular gauge (30), shown in FIG. 3 and FIG. 4;
- At least one fourth gauge (40) made up of a straight edge (41) and a protruding part (42) positioned at one end of the straight edge (41), illustrated in FIG. 5 and FIG. 6.

The first gauge (10) is a square cutout. In FIGS. 1 and 2, two first gauges are shown. A first square gauge (10) makes it possible to inspect flaws having an excessively large and/or small groove height in the case of a convex angle, said first square gauge (10) also making it possible to inspect a flaw with an excessive asymmetry in the case of a concave or convex angle bead. Preferably, the length (c or d) of the side of the first gauges (10) is comprised between 1 mm and 30 mm, more preferably between 1 mm and 25 mm, still more preferably between 1 mm and 20 mm, and most preferably between 2 mm and 20 mm.

According to one preferred embodiment of the disclosure, the device (1) comprises several first gauges (10), for example at least two, or at least three, or at least four. The first gauges (10) then have a different length (c, d), as illustrated in FIG. 1, or the length (c) of the side of a first gauge is greater than the length (d) of another first gauge. This embodiment makes it possible to have a device (1) able to inspect the acceptability of a flaw according to several standards.

The second gauge (20) is a cutout made up of a first concave cutout (21) comprising a pilot point (22) at the center of the cutout extending toward the outside. In FIGS. 1 and 2, two second gauges are shown. A second gauge (20) makes it possible to inspect flaws having an excessively large and/or small groove height in the case of a concave bead angle.

Preferably, the distance (g or h) between a distal end (23) of a pilot point (22) and a point (X) situated at an intersection resulting from the extension of the edges surrounding the first concave cutout (21) is comprised between 1 mm and 30 mm, more preferably between 1 mm and 25 mm, still more preferably between 1 mm and 20 mm, and most preferably between 2 mm and 20 mm. Preferably, the edges surrounding the first concave cutout (21) are perpendicular.

According to one preferred embodiment of the disclosure, the device (1) comprises several second gauges (20), for example at least two, or at least three, or at least four. The second gauges (20) then have a different distance (g, h), as illustrated in FIG. 1, where the distance (h) between the distal end (23) of the pilot point (22) and the point (X) situated at the intersection of the extension of the edges surrounding the first concave cutout is greater than the distance (g) from another second caliber. This embodiment makes it possible to have a device (1) able to use a second gauge to inspect the acceptability of a flaw according to several standards.

The third gauge (30) is a rectangular cutout. In FIGS. 3 and 4, three third gauges (30) are illustrated. A rectangular third gauge (30) makes it possible to inspect flaws having an excessive overthickness and/or an excessive convexity.

Preferably, the length (i or k or m) of the rectangle (30) is comprised between 2 mm and 50 mm, more preferably between 2 mm and 35 mm, still more preferably between 2 mm and 25 mm, and most preferably between 3 mm and 20 mm.

Preferably, the width (l or j or n) of the rectangle (30) is comprised between 1 mm and 30 mm, more preferably between 1 mm and 25 mm, still more preferably between 1 mm and 20 mm, and most preferably between 2 mm and 15 mm.

According to one preferred embodiment of the disclosure, the device (1) comprises several third gauges (30), for example at least two, or at least three, or at least four. The third gauges (10) then have a different length (i, k, m), as illustrated in FIG. 3, or the length (k) of the rectangle is greater than the length (m or i) of another third gauge. This embodiment makes it possible to have a device (1) able to inspect the acceptability of a flaw according to several standards.

According to one preferred embodiment of the disclosure, the device (1) comprises several third gauges (30), for example at least two, or at least three, or at least four. The third gauges (10) then have a different width (l, j, n), as illustrated in FIG. 3, or the length (n) of the rectangle is greater than the length (j or l) of another third gauge. This embodiment makes it possible to have a device (1) able to inspect the acceptability of a flaw according to several standards.

The fourth gauge (40) is made up of a straight edge (41) and a protruding part (42) positioned at one end of the straight edge (41). In FIGS. 5 and 6, three fourth gauges are illustrated. A fourth gauge (40) makes it possible to inspect flaws having an open shrinkage cavity with an excessive pit crater and/or an excessive undercut and/or an excessive shrinkage groove and/or an excessive root shrinkage concavity.

Preferably, and as illustrated in FIG. 5, a second concave cutout (43) is arranged between the straight edge (41) and the protruding part (42) in order to facilitate the placement of the gauge on the weld beads.

Preferably, the height (o or q or p) of the protruding part (42) of the fourth gauge (40) is comprised between 0.2 mm and 5 mm, more preferably between 0.2 mm and 4 mm, still more preferably between 0.3 mm and 4 mm, and most preferably between 0.3 mm and 3 mm.

According to one preferred embodiment of the disclosure, the device (1) comprises several fourth gauges (10), for example at least two, or at least three, or at least four. The fourth gauges (10) then have a different height of the protruding part (o, q, p), as illustrated in FIG. 5, where the height (p) of the protruding part of a fourth gauge is greater than the height (o or q) of another protruding part of another fourth gauge. This embodiment makes it possible to have a device (1) able to inspect the acceptability of a flaw according to several standards.

Figure 7:
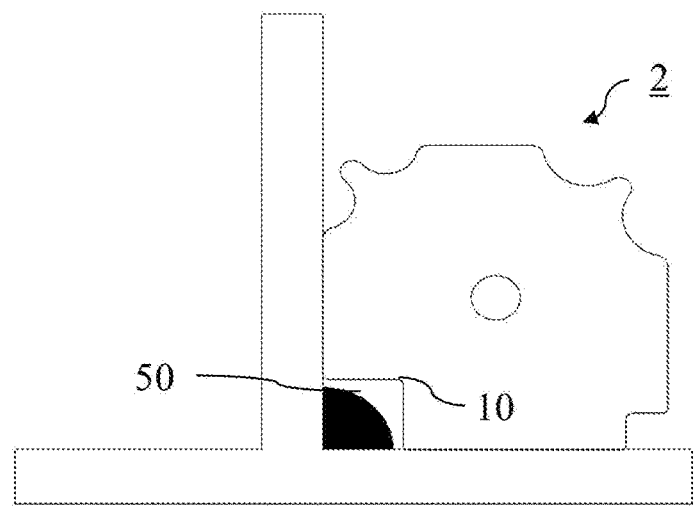
FIG. 7 is an illustration of the inspection of a weld bead by a first gauge.
Figure 8:
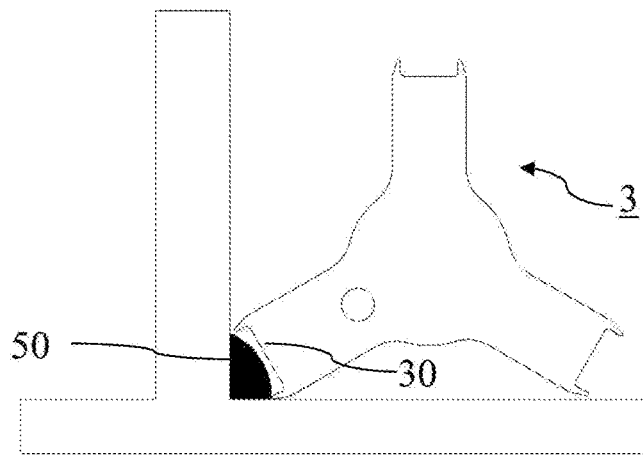
FIG. 8 is an illustration of the inspection of a weld bead by a third gauge.
Figure 9:
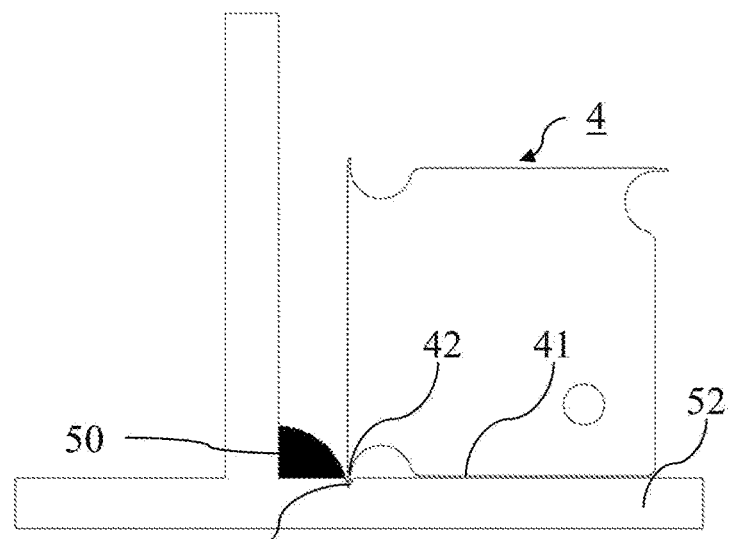
FIG. 9 is an illustration of the inspection of a weld bead by a fourth gauge.

Different uses and/or methods of the device 1 are illustrated in FIGS. 7, 8 and 9.

In FIG. 7, a method comprises a first gauge (10) usable to inspect a flaw on a weld bead (50) having a convex surface. The second gauges are used to inspect a flaw on a weld bead having a concave surface.

In FIG. 8, a method comprises a third gauge (30) usable to inspect a flaw on a weld bead (50) having a convex surface, the cutout of the rectangle making it possible to determine whether the convexity is in accordance with a particular standard. When the large side of the cutout rectangle is applied on the weld bead apex, if the ends of the two tips are simultaneously in contact with the edges of the weld bead, the flaw is in accordance with a quality standard. Conversely, when the two tips are not in contact simultaneously with the edges of the weld bead, the flaw is clearly outside the limits of the standard.

In FIG. 9, a method comprises a fourth gauge usable to inspect a flaw on a weld bead (50), the protruding part making it possible to determine whether the depth of the undercut (51) is in accordance with a particular standard. When the straight edge (41) is in contact over its entire length with the welded material (52), the flaw is clearly outside the limits of the standard. Conversely, if the straight edge (41) is in not contact over its entire length with the welded material (52), the height of the undercut is compliant with a quality standard.

Example Embodiment

In at least one embodiment, the different gauges (10, 20, 30, 40) are positioned on a plurality of elements belonging to the device (1) according to the present devices and/or methods. It is understood that the various gauges may also be positioned on a single element.

According to this embodiment, the first element (2) is square, the dimension of its side varying from 25 to 35 mm, which makes it very easy to handle. Said first element (2) has, in two of its corners, first gauges (10), or square cutouts. The widths of said squares (c, d) are defined by the type of flaw to be inspected as well as the requirements of the applied standards. Said first element (2) has, in two of its corners, second gauges (20), or concave cutouts with a pilot point. The dimensions of said second gauges are defined by the type of flaw to be inspected as well as the requirements of the applied standards. The first gauges and the second gauges make it possible to verify, according to the requirements of the applied standard, the asymmetry as well as the height of the groove of a concave or convex weld bead.

The second element (3) comprises a central part in the form of a circle (7); its diameter varies from 20 to 25 mm, which makes it very easy to manipulate. Three extensions (8) measuring 10 to 15 mm long are placed equidistantly on the periphery of this circle, each said extension having a third gauge (30) at its end, i.e., a rectangular cutout. The widths and lengths of said third gauges (j, k, l for the widths and i, k and m for the lengths, respectively) are defined by the requirements of the applied standards. Said third gauges make it possible to verify, according to the requirements of the applied standard, the overthickness of a convex weld bead.

The third element (4) is also square, the dimension of its side varying from 25 to 35 mm, which makes it very easy to manipulate. Said third element (4) has a fourth gauge (30) in three of these corners. The dimensions of the protruding parts (42) (o, p and q) are defined by the type of flaw to be inspected as well as the requirements of the applied standards. Said fourth gauge (40) makes it possible to verify, according to the requirements of the applied standard, the etching and undercuts of the weld beads.

The present devices and methods have been described in connection with specific embodiments, which have a purely illustrative value and must not be considered limiting. In general, it will appear obvious for one skilled in the art that the present devices and/or methods are not limited to the examples illustrated and/or described above. The presence of reference numbers in the drawings cannot be considered limiting, including when these numbers are indicated in the claims.

The use of the verbs "comprise", "include", "have", or any other alternative, as well as their conjugated forms, cannot in any manner preclude the presence of elements other than those mentioned.

The use of the definite article "a", "an", or the definite article "the", to introduce an element does not preclude the presence of a plurality of these elements. The present devices and/or methods may comprise at least one gauge configured for inspecting weld seams comprising a plurality of cutouts: a square cutout, a rectangular cutout, a concave cutout with a protuberance; and a straight edge ending with a protruding part. This gauge makes it possible to inspect the compliance of a weld bead with various quality standards, without taking measurements, or referring to said standards.

The invention claimed is:

1. A device configured for inspecting at least one flaw of a weld bead relative to a welding quality standard, the device comprises a plurality of gauges positioned on one or several elements of the device, the plurality of gauges comprising:

a) at least one first gauge made of a square cutout;

b) at least one second gauge made of a first concave cutout comprising a pilot point extending toward an outside of the first concave cutout;

c) at least one third gauge made of a rectangular cutout; and d) a first fourth gauge made of a straight edge extending along a first straight line and a sole and unique first protruding part extending at a first distance from the first straight line or having a distal end that is at a first distance from the first straight line.

2. The device according to claim 1, wherein the first fourth gauge further comprises a second concave cutout positioned between the sole and unique first protruding part and the straight edge.

3. The device according to claim 1, wherein a side of the square cutout has a length in a range between 1 mm and 30 mm.

4. The device according to claim 1, wherein a distance between an end of the pilot point extending toward the outside of the first concave cutout and a point situated at an intersection between two edges positioned on both sides of the first concave cutout is in a range between 1 mm and 30 mm.

5. The device according to claim 1, wherein a length of the rectangular cutout is in a range between 2 mm and 50 mm.

6. The device according to claim 1, wherein a width of the rectangular cutout is in a range between 1 mm and 30 mm.

7. The device according to claim 1, wherein the first distance of the sole and unique first protruding part from the first straight line is between 0.2 mm and 5 mm.

8. The device according to claim 1, wherein the device comprises at least two first gauges, and in that the sides of the square cutouts have different lengths.

9. The device according to claim 8, wherein the device comprises at least two second gauges, and in that distances between distal ends of pilot points extending toward the outside of first concave cutouts and the points situated at intersections between two edges positioned on both sides of the first concave cutouts are different.

10. The device according to claim 8, wherein the device comprises at least two third gauges, and in that the lengths of the rectangles are different.

11. The device according to claim 8, further comprising:
at least one second fourth gauge made of a straight edge extending along a second straight line and a sole and unique second protruding part extending at a second distance from the second straight line of the at least one second fourth gauge or having a distal end that is at a second distance from the second straight line of the at least one fourth gauge, wherein the first distance of the sole and unique first protruding part is a different distance than the second distance of the sole and unique second protruding part.

12. A method comprising:
inspecting at least one dimension of a weld bead by at least one gauge of the device according to claim 1 based on dimensional values of at least one welding quality standard, wherein the at least one gauge of the device is selected from the at least one first gauge, the at least one second gauge, the at least one third gauge and the first fourth gauge of the device.

* * * * *